US009939867B2

(12) United States Patent
Allen-Ware et al.

(10) Patent No.: US 9,939,867 B2
(45) Date of Patent: *Apr. 10, 2018

(54) HANDLING A FAILURE IN A SYSTEM WITH DISTRIBUTED CONTROL OF POWER AND THERMAL MANAGEMENT

(71) Applicant: International Business Machines Corporation, Armonk, NY (US)

(72) Inventors: Malcolm S. Allen-Ware, Austin, TX (US); Martha Ann Broyles, Austin, TX (US); Glenn Rueban Miles, Austin, TX (US); Todd Jon Rosedahl, Zumbrota, MN (US); Guillermo Jesus Silva, Austin, TX (US); Gregory Scott Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/753,965

(22) Filed: Jun. 29, 2015

(65) Prior Publication Data

US 2016/0378158 A1    Dec. 29, 2016

(51) Int. Cl.
*G06F 11/07* (2006.01)
*G06F 1/30* (2006.01)
(Continued)

(52) U.S. Cl.
CPC .............. *G06F 1/30* (2013.01); *G06F 1/24* (2013.01); *G06F 1/28* (2013.01); *G06F 1/3203* (2013.01);
(Continued)

(58) Field of Classification Search
CPC .... G06F 1/3293; G06F 1/3296; G06F 1/3287; G06F 1/3243; G06F 1/3206; G06F 1/3203; G06F 1/3234; G06F 1/28; G06F 11/0754

See application file for complete search history.

(56) References Cited

U.S. PATENT DOCUMENTS 5,408,648 A * 4/1995 Gokan ................. G06F 11/004
714/22
7,149,907 B2    12/2006 McAfee et al.
(Continued)

FOREIGN PATENT DOCUMENTS

EP    1771787    1/2009

OTHER PUBLICATIONS

Bartolini, et al., "Thermal and Energy management of High-Performance Multicores: Distributed and Self-Calibrating Model-Predictive Controller", Jan. 2013, pp. 170-183.
(Continued)

*Primary Examiner* — Joseph O Schell
(74) *Attorney, Agent, or Firm* — DeLizio Law, PLLC

(57) ABSTRACT

An apparatus includes a plurality of components and a plurality of component controllers. Each of the plurality of component controllers is associated with at least one component of the plurality of components. Each component controller is configured to compute a local power budget for the at least one component based, at least in part, on the power differential and the proportion of the total power consumption corresponding to the at least one component. A service processor is configured to determine failure associated with at least one component controller of the plurality of component controllers or the at least one component associated with the at least one component controller. The service processor is configured to in response to a reset threshold not being exceeded, reset the at least one compo-
(Continued)

nent controller without interrupting operations of any components of the at least one component that have not failed.

13 Claims, 8 Drawing Sheets

(51) Int. Cl.
    *G06F 1/24*     (2006.01)
    *G06F 1/32*     (2006.01)
    *G06F 11/14*     (2006.01)
    *G06F 1/28*     (2006.01)

(52) U.S. Cl.
    CPC ...... *G06F 11/0721* (2013.01); *G06F 11/0724* (2013.01); *G06F 11/0778* (2013.01); *G06F 11/0793* (2013.01); *G06F 11/1441* (2013.01); *G06F 1/3234* (2013.01); *G06F 1/3287* (2013.01); *G06F 11/0754* (2013.01); *G06F 2201/805* (2013.01); *G06F 2201/85* (2013.01)

(56) References Cited

U.S. PATENT DOCUMENTS

| | | | |
|---|---|---|---|
| 8,316,244 | B1 | 11/2012 | Tupy et al. |
| 2006/0288241 | A1* | 12/2006 | Felter ............... G06F 1/3203 |
| | | | 713/300 |
| 2007/0049133 | A1* | 3/2007 | Conroy ............... G06F 1/26 |
| | | | 439/894 |
| 2008/0228959 | A1* | 9/2008 | Wang ............... G06F 1/206 |
| | | | 710/22 |
| 2008/0307134 | A1 | 12/2008 | Geissler et al. |
| 2010/0333113 | A1* | 12/2010 | Johnson ............ G06F 9/4881 |
| | | | 719/318 |
| 2012/0173899 | A1* | 7/2012 | Swindell ............ G06F 1/266 |
| | | | 713/310 |
| 2013/0061064 | A1* | 3/2013 | Ananthakrishnan ...... G06F 1/26 |
| | | | 713/300 |
| 2014/0025208 | A1 | 1/2014 | Allen-Ware et al. |
| 2014/0149761 | A1* | 5/2014 | Allen-Ware ......... G06F 1/3234 |
| | | | 713/320 |

OTHER PUBLICATIONS

Venkataramanan, "An Integrated Architectural Framework for Power Conversion Systems", IEEE publication, 2000, pp. 12-16.
Wu, et al., "Distributed Thermal Management for Embedded Heterogeneous MPSoCs with Dedicated Hardware Accelerators", IEEE publication, 2011, pp. 183-189.
"U.S. Appl. No. 14/833,716 FAI Office Action Summary", dated Apr. 18, 2017, 7 pages.
"U.S. Appl. No. 14/833,716 FAIIP PreInterview Comm", dated Jan. 30, 2017, 12 pages.

* cited by examiner ns that occur in

HANDLING A FAILURE IN A SYSTEM WITH DISTRIBUTED CONTROL OF POWER AND THERMAL MANAGEMENT

BACKGROUND

Embodiments of the inventive subject matter generally relate to the field of computer systems, and, more particularly, to failure recovery of distributed control of power and thermal management.

In the field of computing (e.g., servers), power and thermal management can be an important issue because of the continually increasing demands on processing rate and cooling capacity. A key element to power management is a centralized entity that implements power and thermal management across the different devices (e.g., processors, memories, etc.) in the system. Centralized management can be challenging when devices exceed power limits with sudden changes in power consumption. For example, a statistically rare event can arise from alignment of all devices suddenly increasing their usage simultaneously. As the number of devices in a computer system (e.g., a server) contributing to power swings increases, the processing load on the power management entity increases.

SUMMARY

In some embodiments, an apparatus includes a plurality of components and a plurality of component controllers. Each of the plurality of component controllers is associated with at least one component of the plurality of components. Each component controller is configured to determine a power differential as a difference between a power cap for the apparatus and a total power consumption for the apparatus. Each component controller is configured to determine a proportion of the total power consumption corresponding to the at least one component associated with the component controller. Each component controller is configured to compute a local power budget for the at least one component based, at least in part, on the power differential and the proportion of the total power consumption corresponding to the at least one component. A service processor is coupled to the plurality of component controllers. The service processor is configured to determine failure associated with at least one component controller of the plurality of component controllers or the at least one component associated with the at least one component controller. The service processor is configured to in response to a reset threshold not being exceeded, reset the at least one component controller without interrupting operations of any components of the at least one component that have not failed.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
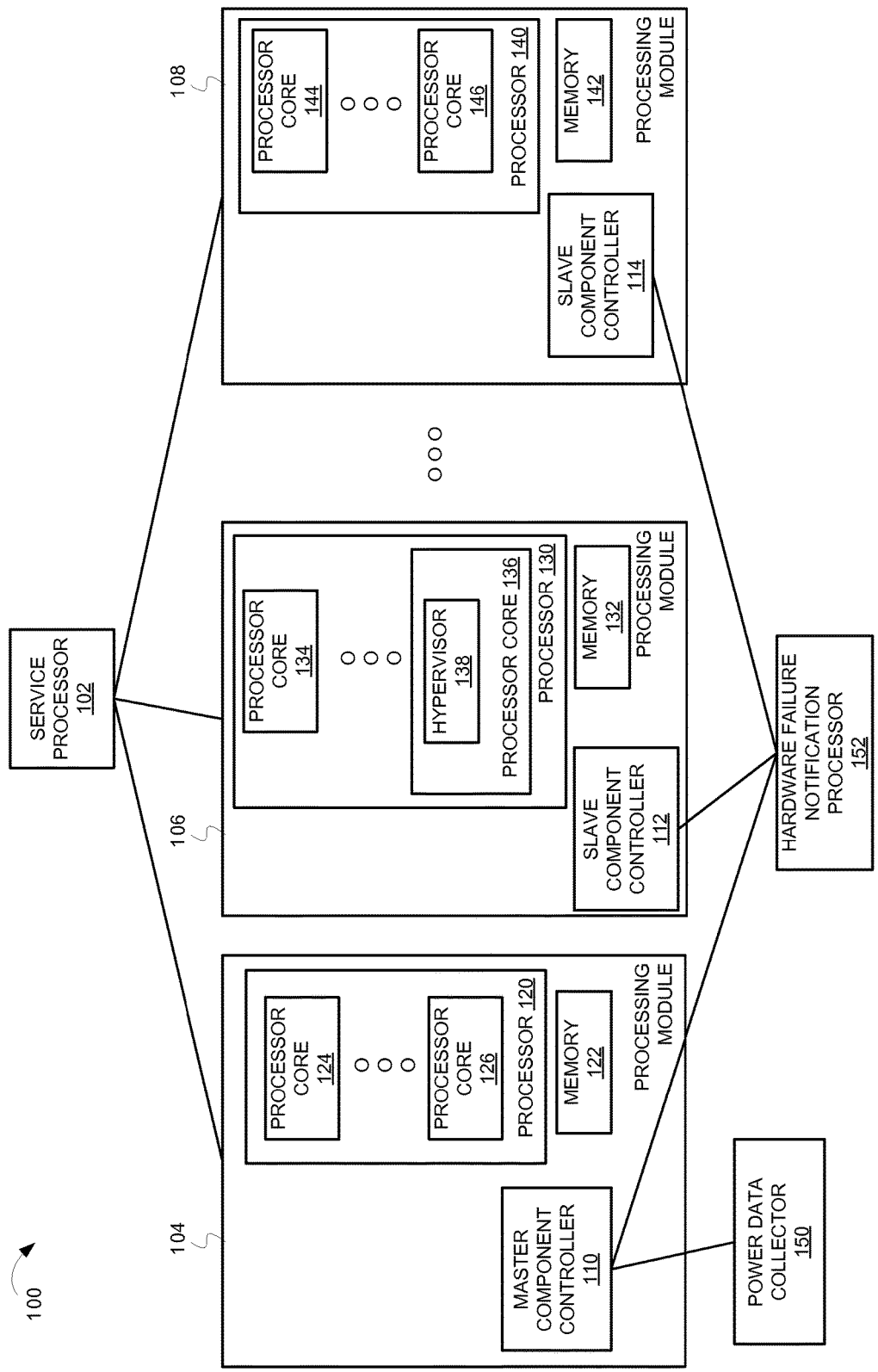
FIG. 1 depicts a node having failure recovery for distributed control of power and thermal management, according to some embodiments.

The description that follows includes exemplary systems, methods, techniques, instruction sequences and computer program products that embody techniques of the present inventive subject matter. However, it is understood that the described embodiments may be practiced without these specific details. For instance, although examples suggest a 1:1 relationship between management controllers and devices, a management controller can be associated with multiple devices. In other instances, well-known instruction instances, protocols, structures and techniques have not been shown in detail in order not to obfuscate the description.

In some embodiments, a computer system or node includes a number of different components (or devices). Examples of components include a processor, a memory module, an input/output hub controller, a processor core, a core memory, etc. Each of the different devices can include a power and thermal management controller (hereinafter referred to as "component controller") to manage power consumption and thermal protection for the component. For example, if the component is a processor, the component can include a processor core and an on-chip controller, wherein the on-chip controller is the component controller. The node can also include an independent central power management processor (hereinafter referred to as "service processor") to centrally manage the different component controllers in the node. Some embodiments provide a reliable, distributed system of out-of-band management for the power and thermal protection of the different components using the service processor. The service processor can serve as one point of control in this distributed node to detect failures of any of these components and to continue to safe guard the node in terms of power and thermal characteristics. Some embodiments can include operations to return a failed component to an operational state. Examples of the failures in the components can be in the firmware, hardware, etc. Also, some embodiments can determine when hardware that is crucial to a component controller has failed.

The service processor can monitor the node for irregular behavior that could result in a reset of one or more of the component controllers. Examples of irregular behavior can include loss of communication between the service processor and a component controller and failure of a component controller to maintain a hard power cap on the amount of power consumed by the components that the component controller is controlling. Other examples of irregular behavior can include failure of a component controller to maintain a thermal threshold of a given component (e.g., a processor core) and failure of communication between a component controller and a given component. Another example can include failure of a component controller to transition to a different state. For example, the component controller can be in either an observation state or an active state. In the observation state, the component controller can monitor power, thermal threshold, etc. of the different component. In the active state, the component controller can (in addition to monitoring) modify the parameters of the components (e.g., voltage and frequency of a processor core) to alter the power consumption or thermal output of the component. Therefore, if the component controller fails to transition between the two states, there can be considered a failure of the component controller.

In some embodiments, after a component controller has been reset a defined number of times, the component controller is placed in a "safe" mode. In the "safe" mode, the component controller can attempt to set the power management settings for the components in the processing module at safe values. The component controller can also attempt to drop the power management settings of the processor cores and the memory. For example, the component controller would decrease the voltage and frequency of the processor cores to some determined safe thresholds. The component controller can also throttle the memory to limit the number of accesses to and from the memory. Also as part of the "safe" mode, the component controller can increase the speed of any fans in the processing module to attempt to decrease the ambient temperature. Further description of the "safe" mode is set forth below.

FIG. 1 depicts a node having failure recovery for distributed control of power and thermal management, according to some embodiments. A node 100 includes a service processor 102 and multiple processing modules. In this example, each processing module includes an associated component controller. At least one of the component controllers is designated as a master component controller, while the remaining component controllers are designated as slave component controllers.

FIG. 1 only depicts three processing modules 102, 110, and 112 to avoid adding unnecessary complexity to the figure. Each processing module can include multiple components. In this example, the processing module 104 includes the following components: a processor 120 with multiple processor cores (a processor core 124 and a processor core 126) and a memory 122. The processing module 104 also includes a master component controller 110.

The processing module 106 includes the following components: a processor 130 with multiple processor cores (a processor core 134 and a processor core 136) and a memory 132. In this example, the processor core 136 is executing a hypervisor 138, whose operations are further described below. The processing module 106 also includes a slave component controller 112. The processing module 108 includes the following components: a processor 140 with multiple processor cores (a processor core 144 and a processor core 146) and a memory 142. The processing module 108 also includes a slave component controller 114.

The node 100 also include a power data collector 150 and a hardware failure notification processor 152. The power data collector 150 is communicatively coupled to the master component controller 110. In some embodiments, a different component controller (e.g., the slave component controller 112) is designated as the backup master component controller. Therefore, if the master component controller 110 is reset (without resetting all the component controllers), the backup master component controller can become the active master component controller. In such embodiments, the power data collector 150 would also be communicatively coupled to the back master component controller. The power data collector 150 is configured to collect power data from the different components (e.g., different processor cores) in the node 100. The power data collector 150 also collects power consumed by fans (not shown in FIG. 1) used to cool the different components in the node 100. After collecting the power data, the power data collector 150 transmits the power data to the master component controller 110. The master component controller 110 can then distribute power data from the different processing modules to the different associated slave component controllers. The component controller can then adjust the power consumption of its different components (as described below).

The hardware failure notification processor 152 is communicatively coupled to each of the component controllers (the master component controller 110, the slave component controller 112, and the slave component controller 114). The hardware failure notification processor 152 provides communications to the component controllers about hardware failures. For example, the hardware failure notification processor 152 can transmit an oversubscription signal that notifies a component controller when one power supply is lost in a redundant power supply configuration. In another example, the hardware failure notification processor 152 can notify the component controller when a fan stops working or is having errors. Although not shown, each of the component controllers are also communicatively coupled together.

The service processor 102 can collect component power consumption data from each of the component controllers 110, 112, and 114 at periodic intervals. For instance, the service processor 102 can collect power consumption data from all of the components controllers 110, 112, and 114 within a time period x. The power consumption data indicates power consumption that can be attributed to a single component. But the power may be consumed by the component and sub-components and/or other coupled components. For instance, power consumption data may indicate an amount of power consumption attributable to a processor component. But the power is actually consumed by the processor component, off-chip cache of the processor component, and random access memory used by the processor component. Collection of the power consumption data can be in accordance with a push method, pull method, or a combination of both. The service processor 102 can also collect background power consumption data (e.g., fan power consumption). In addition to collecting power consumption data, the service processor 102 can filter the power consumption data to remove electrical noise that may occur in the power consumption data.

The service processor 102 can distribute the collection of component power consumption data to the component controllers 110, 112, and 114. If the upper power consumption threshold for the node ("node power cap") is not already known or readily accessible by each controller (e.g., the node power cap is set at boot-up in memory available to the controllers), the service processor 102 can also communicate the node power cap to each of the component controllers 110, 112, and 114.

Each of the component controllers 110, 112, and 114 compute a proportional component power budget for their associated components. The below tables illustrate proportional component power budgets based on node power consumption.

TABLE 1

| Core No. | Component | $T_0$ (W) | Workload |
|---|---|---|---|
| Core$_0$ | Processor | 170 | Processor 0 Working |
| | Memory | 90 | DIMMs for Processor 0 Working |

TABLE 1-continued

| Core No. | Component | $T_0$ (W) | Workload |
|---|---|---|---|
| $Core_1$ | Processor | 110 | Processor 1 Idling |
| | Memory | 50 | DIMMs for Processor 1 Idling |
| $Core_2$ | Processor | 110 | Processor 2 Idling |
| | Memory | 50 | DIMMs for Processor 2 Idling |
| $Core_3$ | Processor | 110 | Processor 3 Idling |
| | Memory | 50 | DIMMs for Processor 3 Idling |
| Background | N/A | 100 | Background Power |
| Total Power | | 840 | |

Table 1 indicates component power consumptions for a node. The node has four cores and eight components (two components per core—a processor component and a memory component). The power consumption of each component (in Watts) during the time period 0 is indicated in the "$T_0$" column. During time period 0, $Core_0$ consumed a total of 260 W (processor component: 170 W, memory component 90 W). As indicated by the "Workload" column, $Core_0$ was working and not in an idle state during time period 0. $Cores_{1-3}$, however, were in an idle state during time period 0, and consumed less power than $Core_0$ (160 W per core— each processor component of $Cores_{1-3}$: 110 W, each memory component of $Cores_{1-3}$ 50 W). Table 1 also includes the background power consumed during time period 0. The node power consumption was 840 W during time period 0 (including background power consumption of 100 W).

Assuming the node has a node power cap of 1000 W, the node underutilized the total power capacity by 160 W during time period 0. After receiving the power consumption data (depicted in Table 1), each of the component controllers of the node calculates a component power budget for time period 1. Table 2 shows a computation of proportional component power budgets on a pro-rata basis.

TABLE 2

| Core No. | Component | $T_0$ (W) | Frac. | Frac. * Avail. (W) | $T_1$ (W) |
|---|---|---|---|---|---|
| $Core_0$ | Processor | 170 | 20.2% | 32.4 | 202.4 |
| | Memory | 90 | 10.7% | 17.1 | 107.1 |
| $Core_1$ | Processor | 110 | 13.1% | 21.0 | 131.0 |
| | Memory | 50 | 6.0% | 9.5 | 59.5 |
| $Core_2$ | Processor | 110 | 13.1% | 21.0 | 131.0 |
| | Memory | 50 | 6.0% | 9.5 | 59.5 |
| $Core_3$ | Processor | 110 | 13.1% | 21.0 | 131.0 |
| | Memory | 50 | 6.0% | 9.5 | 59.5 |
| Background | N/A | 100 | 11.9% | 19.0 | 119.0 |
| Total | | 840 | | | 1000 |

As discussed previously, the excess power to be allocated for time period 1 is 160 W. During time period 0, $Core_0$'s processor component consumed 170 W. This represents roughly 20% of the node power consumed during time period 0. Therefore, $Core_0$'s processor component will be budgeted roughly 20% of the 160 W of excess power during time period 1, or roughly 32 W of the excess power. $Core_0$'s processor component will be budgeted roughly 202 W for time period 1.

The above example illustrates the efficiency of locally computing power budget computations relative to a centralized approach. Instead of one of the cores or another processing being burdened with computing the power budgets for 4 cores (i.e., 8 components), each component controller computes a power budget for only two components. Consequently, each component controller makes only five power budgeting calculations per time period:

1. Determine the reciprocal of the node power consumption ("1/Node")
2. Determine the processor component's fractional power consumption for time period 0 ("$Frac._p$") by multiplying the processor component's power consumption for time period 0 by 1/Node
3. Determine the processor component's proportion of the excess power for time period 1 by multiplying the excess power available for time period 0 by $Frac._p$
4. Determine the memory component's fractional power consumption for time period 0 ("$Frac._m$") by multiplying the memory component's power consumption for time period 0 by 1/Node
5. Determine the memory component's proportion of the excess power for time period 1 by multiplying the excess power available for time period 0 by $Frac._m$ These five calculations are estimated to consume less than 100 cycles. Assuming 2 ns per cycle, the time consumed by a process requiring 100 cycles is 200 ns. If, for example, each time period is 250 μs, at less than 100 cycles, the processing time for each component controller to calculate power budgets is less than one percent of the 250 μs time period (<200 ns/250 μs→ or <0.8%). This results in a processing consumption of less than 1% in terms of the component controllers instructions per second.

In some cases, a node may consume more power than the given total power capacity defined or set for the node. Embodiments can use the distributed computation of proportional component power budgets to throttle power consumption in a proportional manner across the components. An example of this is depicted in Tables 3 and 4.

TABLE 3

| Core No. | Component | $T_2$ (W) | Workload |
|---|---|---|---|
| $Core_0$ | Processor | 220 | Processor 0 Working |
| | Memory | 120 | DIMMs for Processor 0 Working |
| $Core_1$ | Processor | 220 | Processor 1 Working |
| | Memory | 120 | DIMMs for Processor 1 Working |
| $Core_2$ | Processor | 110 | Processor 2 Idling |
| | Memory | 50 | DIMMs for Processor 2 Idling |
| $Core_3$ | Processor | 110 | Processor 3 Idling |
| | Memory | 50 | DIMMs for Processor 3 Idling |
| Background | N/A | 100 | Background Power |
| Total Power | | 1100 | |

Table 3 indicates component power consumption for a node during a time period 2. Again, the node has four cores and eight components (two components per core—a processor component and a memory component). Unlike Table 1, Table 3 indicates that both $Core_0$ and $Core_1$ are working and not in an idle state during time period 2. During time period 2, $Core_0$ and $Core_1$ each consume a total of 340 W (each processor component: 220 W, each memory component: 120 W). As in Table 1, both $Core_2$ and $Core_3$ were in an idle state during time period 2, and consumed less power than $Core_0$ and $Core_1$ (160 W per core—each processor component of $Cores_{2-3}$: 110 W, each memory component of $Cores_{2-3}$: 50 W). The node power consumption was 1100 W during time period 2 (including background power consumption of 100 W).

Again, assuming the node has a defined node power cap of 1000 W, the node exceeded the node power cap by 100

W during time period 2. After receiving the power consumption data (depicted in Table 3), individual component controllers of the node calculate component power budgets for time period 3. Table 4 shows a computation of proportional component power budgets on a pro-rata basis. It should be noted that background power is not reduced. Consequently, to bring the node power consumption within the 1000 W node power cap, the node power consumption, excluding background power consumption, must be brought below 900 W. In other words, the component power budget of each component for time period 3 will be reduced by a portion of the 100 W of excess power used based on their power consumption during time period 2.

TABLE 4

| Core No. | Component | $T_2$ (W) | Frac. | Frac. * Excess. (W) | $T_3$ (W) |
| --- | --- | --- | --- | --- | --- |
| $Core_0$ | Processor | 220 | 20.0% | 20.0 | 200.0 |
|  | Memory | 120 | 10.9% | 10.9 | 109.1 |
| $Core_1$ | Processor | 220 | 20.0% | 20.0 | 200.0 |
|  | Memory | 120 | 10.9% | 10.9 | 109.1 |
| $Core_2$ | Processor | 110 | 10.0% | 10.0 | 100.0 |
|  | Memory | 50 | 4.5% | 4.5 | 45.5 |
| $Core_3$ | Processor | 110 | 10.0% | 10.0 | 100.0 |
|  | Memory | 50 | 4.5% | 4.5 | 45.5 |
| Background | N/A | 100 | N/A | N/A | 100.0 |
|  | Total | 1100 |  |  | 1000.1 |

As previously discussed, the excess power consumed by the node during time period 2 was 100 W. Consequently, node power consumption for time period 3 will be reduced by 100 W. During time period 2, $Core_0$'s processor component consumed 220 W. This represents roughly 20% of the node power consumed during time period 2. $Core_0$'s processor component's power budget for time period 3 will be reduced by roughly 20% of the 100 W of excess power consumed during time period 2, or roughly 20 W. $Core_0$'s processor component will be budgeted roughly 200 W for time period 3.

The power budgeting discussed can conserve resources in several scenarios. In a first scenario, a component is consuming relatively little power and the node power consumption is below the node power cap. Because the node power is below the node power cap, it is not necessary for a control system to be engaged. Thus, the component is able to run at its maximum performance.

In a second scenario, a component is consuming relatively greater power and the node power consumption is below the node power cap. Because the node power consumption is below the node power cap, it is not necessary for a control system to be engaged. Thus, the component is able to run at its maximum performance.

In a third scenario, a component is consuming relatively little power and the node power consumption is above the node power cap. Because the node power consumption is above the node power cap, a control system will be engaged and the node power consumption will be reduced. In this scenario, the component controller associated with the component consuming relatively little power can decrease the power budget for the component over subsequent time periods, aiding in bringing the node power consumption below the node power cap. Additionally, if the component consuming relatively little power experiences a sudden increase in workload, the node power cap may not be breached based on the budget given to that component during lower workload periods. This can prevent the node power consumption from breaching the node power cap when components experience a sudden increase in workload.

In a fourth scenario, a component is consuming relatively greater power and the node power consumption is above the node power cap. Because the node power consumption is above the node power cap, a control system will be engaged and the node power consumption will be reduced. In this scenario, the component controller associated with the component consuming relatively greater power can decrease the power budget to the component over subsequent time periods, aiding in bringing the node power consumption below the node power cap. Because the power budgeting is proportional, the component consuming relatively great power will still be budgeted a large portion of the power, relative to the other components. Once below the node power cap, the power budget of the component consuming relatively great power can be increased to increase performance. If the node power cap is once again breached, the process can repeat itself.

As further described below, the service processor 102 can monitor the node 100 for irregular behavior that could result in a reset of one or more of the component controllers 110, 112, and 114. Examples of irregular behavior (e.g., loss of communication the service processor and a component controller) are further described below in reference to the flowcharts depicted in FIGS. 2-5. An example of failure recovery operations are further described below in reference to the flowcharts depicted in FIGS. 6-7.

Figure 2:
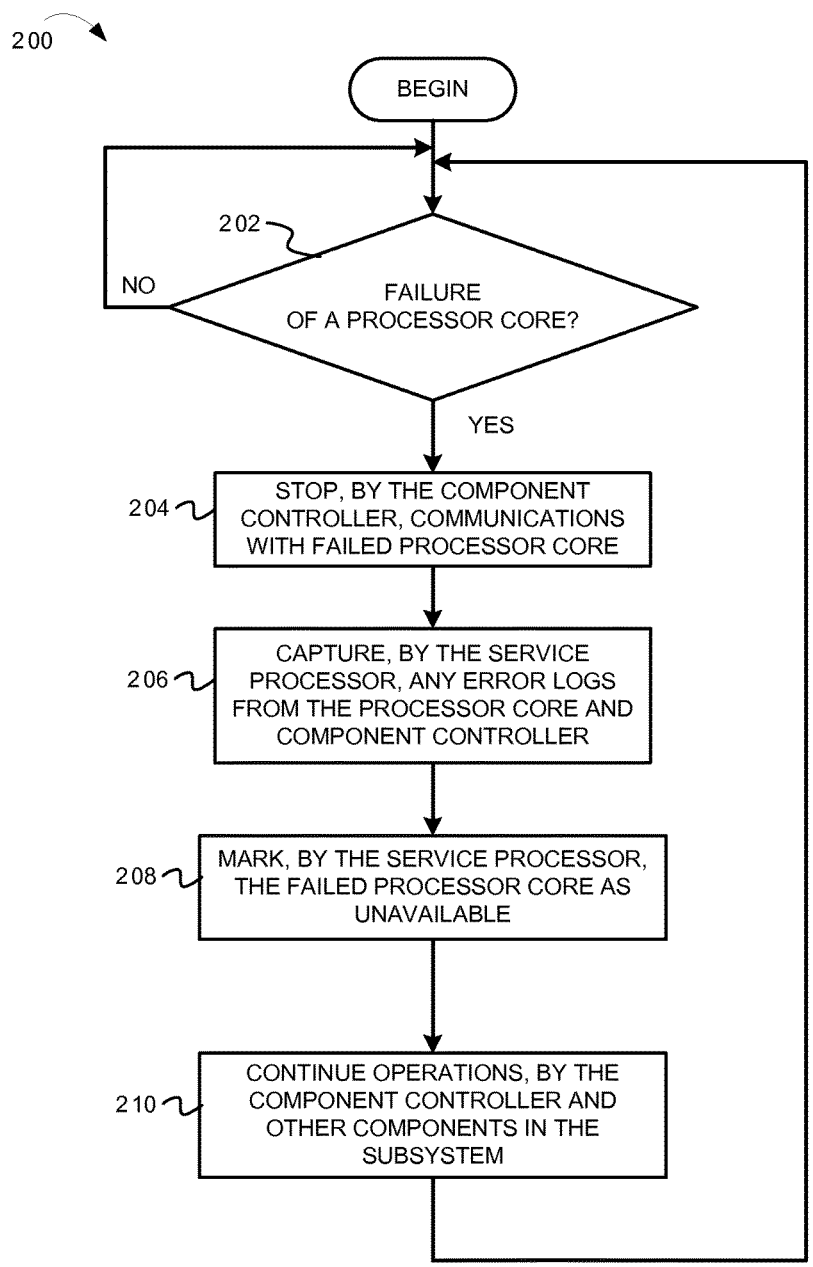
FIG. 2 depicts a flowchart of operations that occur in response to failure of a processor core, according to some embodiments.

FIG. 2 depicts a flowchart of operations that occur in response to failure of a processor core, according to some embodiments. With reference to the example of FIG. 1, the operations can be performed by the service processor and one or more of the component controllers 110, 112, and 114. Operations of the flowchart 200 begin at block 202.

At block 202, the service processor and a component controller determines whether a processor core has failed. In some embodiments, the service processor 102 and the component controller can make this determination by accessing registers of the processor core. For example, the slave component controller 114 can determine whether any of its processor cores (the processor cores 144, 146) have stopped executing. In some embodiments, the component controller has access to registers of the processor core. One of these registers can store data indicating that the processor core has failed. Therefore, the component controller can make this determination by accessing this register to determine if the data stored therein indicates that the processor core has failed. The service processor 102 is also able to access this register to determine whether the processor core has failed. If a processor core has not failed, operations remain at block 202. If a processor core has failed, operations continue at block 204.

At block 204, the component controller stops communications with this processor core. For example, the component controller stops communications with this processor core to perform power and thermal management (as described above). Operations of the flowchart continue at block 206.

At block 206, the service processor can error logs from the processor core and the component controller that are related to the failure. These error logs can help administrators diagnose the failure of the processor core. Operations of the flowchart 200 continues at block 208.

At block 208, the service processor can mark the processor core has unavailable. Therefore, the hypervisor 138 does not assign the processor core to any virtual partition. Also, if the failed processor core is currently assigned to a virtual partition, the hypervisor 138 can assign another processor core (if available) to the virtual partition. Operations of the flowchart 200 continue at block 210.

At block 210, the component controller and the other components in the processing module can continue to operate even though the one processor core failed. For example with reference to FIG. 1, if the processor core 134 has failed, the slave component controller 112, the processor core 136 and the memory 132 can continue to operate. Operations of the flowchart return to block 202, where a check continues to be made for failure of other processor cores in the node 100.

Figure 3:
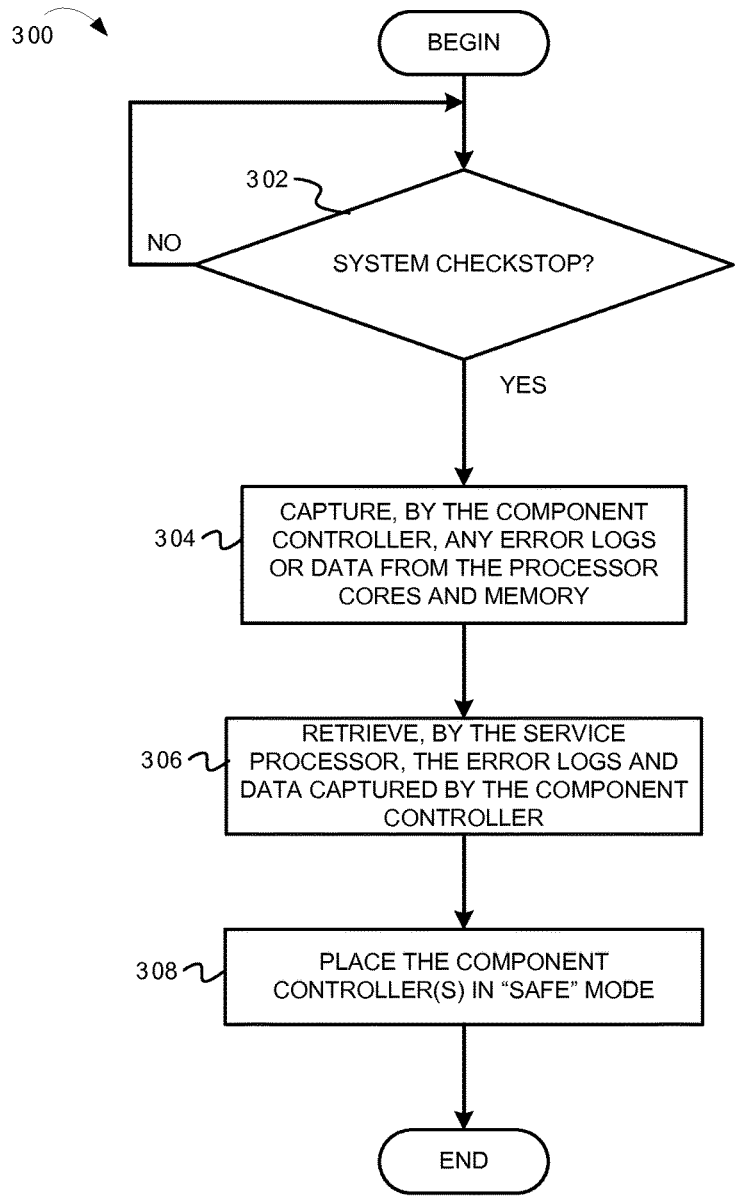
FIG. 3 depicts a flowchart of operations that occur in response to other failures in the components and the component controller, according to some embodiments.
Figure 4:
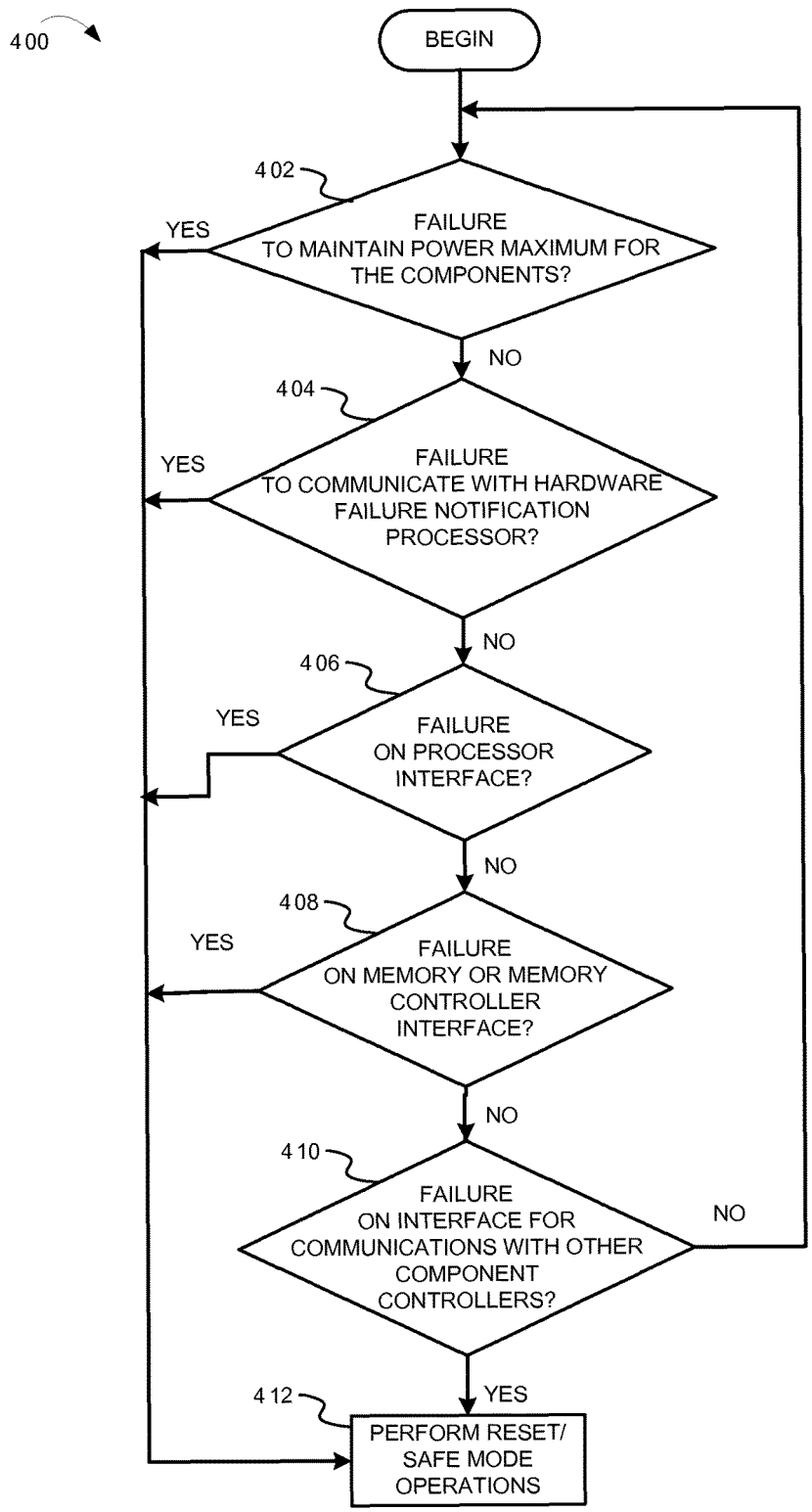
Figure 5:
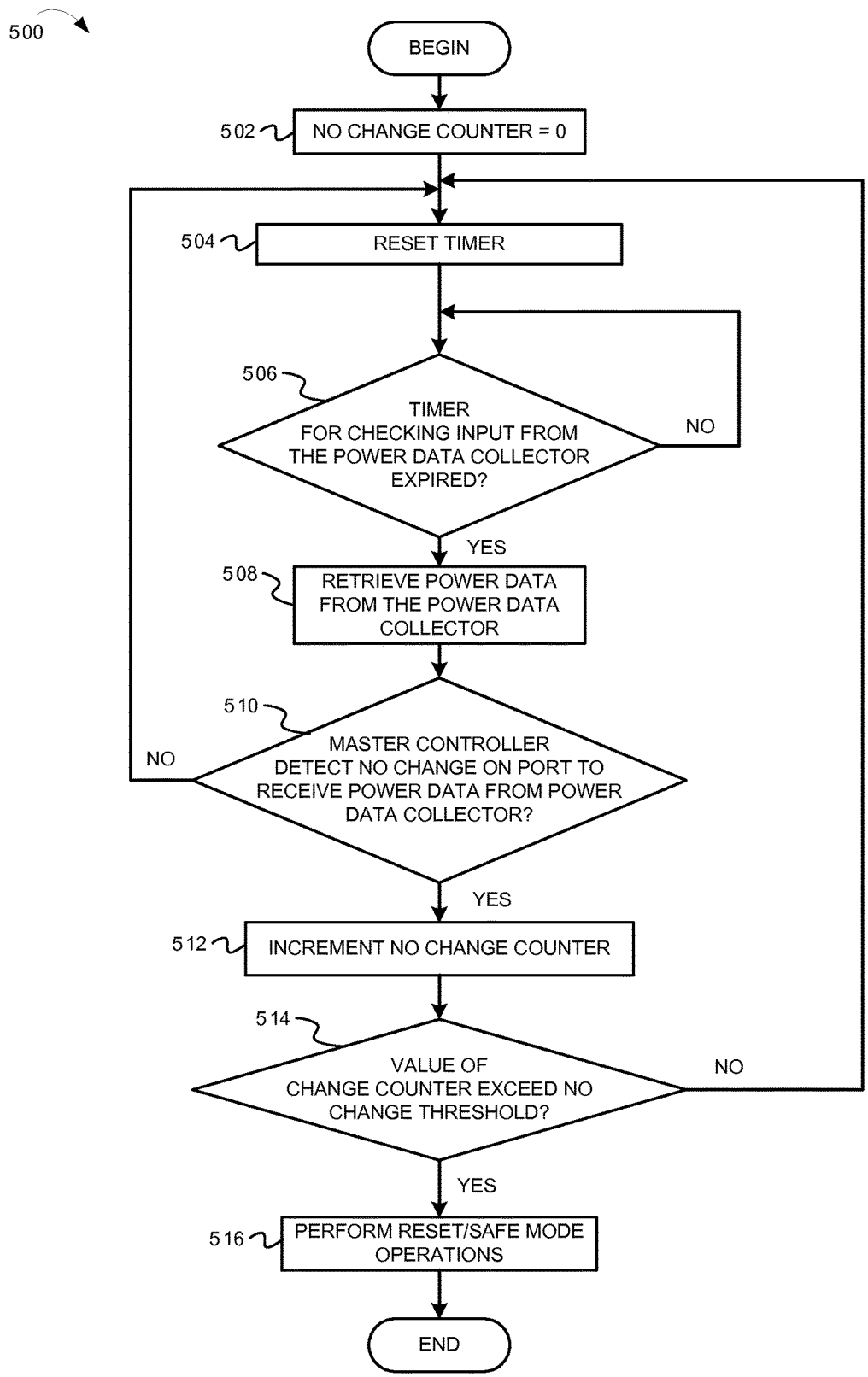
FIG. 5 depicts a flowchart of operations that occur in response to a connectivity failure between the power data collector and the component controller, according to some embodiments.

FIGS. 3-5 depicts different failures that can result in a component controller being reset or placed in a safe mode. The operations depicted in FIGS. 3-5 are described such that only the component controller that has failed or is associated with a failed component is reset or placed in a safe mode. Alternatively, the reset/safe mode operations can occur for all component controllers in the node. For example with reference to FIG. 1, assume that the processor core 126 is in a failed state, the reset/safe mode operations can cause only the master component controller 110 to be reset or placed in a safe mode. Alternatively, failure of one component or component controller can cause all the component controllers in the node 100 (including those in the processing module 104, 106, and 108) to be reset or placed in a safe mode.

FIG. 3 depicts a flowchart of operations that occur in response to a system checkstop, according to some embodiments. With reference to the example of FIG. 1, the operations can be performed by the service processor and one or more of the component controllers 110, 112, and 114. Operations of the flowchart 300 begin at block 302.

At block 302, the component controller determines there is a system checkstop. The component controller makes this determination response to not being able to communicate with any processor in its processing module. For example with reference to FIG. 1, the slave component controller 112 is not able to communicate with any of the processor cores 134,146 in the processor 130. If the component controller determines there is no system checkstop, operations remain at block 302. If the component controller determines there is a system checkstop, operations continue at block 304.

At block 304, the component controller captures any error logs or data from the processor cores or memory related to the system checkstop. For example, the component controller can capture any traces in the memory, read hardware registers, etc. Operations of the flowchart 300 continue at block 306.

At block 306, the service processor retrieves the error logs and data captured by the component controller. For example, the component controller can communicate the error logs and data to the service processor 102. Operations of the flowchart 300 continue at block 308.

At block 308, the component controller is placed in a "safe" mode. In particular, the component controller attempts to set the power management settings for the components in the processing module at safe values. The component controller would attempt to drop the power management settings of the processor cores and the memory. For example, the component controller would decrease the voltage and frequency of the processor cores to some determined safe thresholds. The component controller would also throttle the memory to limit the number of accesses to and from the memory. In some embodiments, the component controller would also increase the speed of any fans in the processing module to attempt to decrease the ambient temperature. Operations of the flowchart 300 are complete.

FIG. 4 depicts a flowchart of operations that occur in response to other failures in the components and the component controller, according to some embodiments. FIG. 4 depicts a flowchart 400 with example failures in the components and the component controllers. In these example failures, the component controller detects a failure in itself or at least one of its components and sends a request to the service processor to be reset. Another example failure detected by the component controller is depicted in FIG. 3, which is further described below.

There can be other failures in the components and component controllers that can result in reset/safe mode operations. Another example is failure of communications between a component controller and the service processor. In particular, the service processor 102 and the component controllers can be configured such that the component controllers are to periodically transmit a polling communication to the service processor 102. The polling communication can indicate that the processing module is operational with no failed components and no failure at the component controller. Alternatively if there is a failure of a component or of the component controller, the component controller can indicate that failure in the polling communication back to the service processor 102. If the service processor determines that the polling communication is not being received from a component controller, the service processor can initiate reset/safe mode operations. The operations of the flowchart 400 can be performed by software, firmware, hardware or a combination thereof. With reference to the example of FIG. 1, the operations can be performed by one or more of the component controllers 110, 112, and 114. Operations of the flowchart 400 begin at block 402.

At block 402, the component controller determines whether there is a failure to maintain a power maximum for the components in its processing module. For example with reference to FIG. 1, the slave component controller 114 determines whether there is a failure to maintain a maximum amount of power assigned to be used for the components in the processing module 108. As described above, each component controller is assigned a maximum amount of power to be used by the components in aggregate in its processing module. Therefore, in this example, the slave component controller 114 can track the amount of power being consumed in aggregate by the components (e.g., the processor cores 144, 146 and the memory 142) in the processing module 108. The slave component controller 114 can then determine if the amount of power consumed in aggregate is exceeding the power maximum assigned to the processing module 108. If there is a failure to maintain a power maximum for the components in its processing module, operations of the flowchart 400 continue at block 412, which is further described below. If there is no failure to maintain a power maximum for the components in its processing module, operations of the flowchart 400 continue at block 404.

At block 404, the component controller determines whether there is a failure to communicate with the hardware failure notification processor. For example with reference to FIG. 1, one of the component controllers (e.g., the slave component controller 112) determines whether there is a failure to communicate with the hardware failure notification processor 152. If there is a failure to communicate with the hardware failure notification processor, operations of the flowchart 400 continue at block 412, which is further described below. If there is no failure to communicate with the hardware failure notification processor, operations of the flowchart 400 continue at block 406.

At block 406, the component controller determines whether there is a failure on a processor interface or processor core interface. For example with reference to FIG. 1, the slave component controller 114 determines whether there is a communication failure with the processor 146 or a communication failure with any one of the processor cores 144, 146. If there is a failure on a processor interface or processor core interface, operations of the flowchart 400 continue at block 412, which is further described below. If there is no failure on a processor interface or processor core interface, operations of the flowchart 400 continue at block 408.

At block 408, the component controller determines whether there is a failure on a memory or memory controller interface. For example with reference to FIG. 1, the slave component controller 114 determines whether there is a communication failure with the memory 142 or the memory controller associated with the memory 142. If there is a failure on a memory or memory controller interface, operations of the flowchart 400 continue at block 412, which is further described below. If there is no failure on a memory or memory controller interface, operations of the flowchart 400 continue at block 410.

At block 410, the component controller determines whether there is a failure on the interface for communications with other component controllers. For example with reference to FIG. 1, the slave component controller 114 determines whether there is a failure on the interface for communications with the master component controller 110 and the slave component controller 112. If there is a failure on the interface for communications with other component controllers, operations of the flowchart 400 continue at block 412. If there is no failure on the interface for communications with other component controllers, operations of the flowchart 400 return to block 402.

At block 412, the component controller performs reset/safe mode operations. The operations of performing reset/safe mode operations are described in flowcharts 600-700 of FIGS. 6-7 (which are described below).

FIG. 5 depicts a flowchart of operations that occur in response to a connectivity failure between the power data collector and the component controller, according to some embodiments. FIG. 5 depicts a flowchart 500 that described in reference to FIG. 1. The flowchart 500 includes example operations for detecting an error on connectivity between the power data collector 150 and the master component controller 110. As described above, the power data collector 150 is configured to collect power data from the different components (e.g., different processor cores) in the node 100. The power data collector 150 can also collect power consumed by fans (not shown in FIG. 1) used to cool the different components in the node 100. After collecting the power data, the power data collector 150 transmits the power data to the master component controller 110. The master component controller 110 can then distribute power data from the different processing modules to the different associated slave component controllers. The component controller can then adjust the power consumption of its different components (as described below). If the power data being received from the power data collector is not changing over time (e.g., across different periodic intervals), the master component controller 110 can assume that there is a failure of the connection between the power data collector 110 and the power data collector 150. The example operations in the flowchart 500 detects for this connectivity error. The operations of the flowchart 500 can be performed by software, firmware, hardware or a combination thereof. With reference to the example of FIG. 1, the operations can be performed by one or more of the component controllers 110, 112, and 114. Operations of the flowchart 500 begin at block 502.

At block 502, the master component controller 110 initializes the no change counter to zero. As described in the operations below, the master component controller 110 increments the no change counter each time the input from the power data collector 150 is checked and the master component controller 110 determines that the input has not changed since the previous check of the input. Operations of the flowchart 500 continue at block 504.

At block 504, the mater component controller 110 resets a timer. The master component controller 110 sets the timer to a timer value and then decrements the timer until the value of the timer equals zero. After the value of the timer equals zero, the master component controller 110 can then check the input from the power data collector 150 so that the input from the power data collector 150 is periodically checked. The master component controller 110 can reset the timer to different values based on different criteria (e.g., the type of hardware components, the number of hardware components, etc.). Example values to which the timer can be reset include 250 microseconds, 500 microseconds, 100 microseconds, etc. Operations of the flowchart 500 continue at block 506.

At block 506, the master component controller 110 determines whether this timer has expired. If the timer has not expired, operations of the flowchart 500 remain at block 506, where a determination is again made of whether the timer has expired. If the timer has expired, operations of the flowchart 500 continue at block 508.

At block 508, the master component controller 110 retrieves the power data from the power data collector 150. The master component controller 110 can retrieve the power data from multiple input ports communicatively coupled to the power data collector 150. For example, the master component controller 110 can retrieve input signals independently from all of the active Analog/Digital (A/D) ports. Operations of the flowchart 500 continue at block 510.

At block 510, the master component controller 110 determines whether there has been no change in the power data received from the power data collector 150. The master component controller 110 can determine whether the power data received during this current retrieval is the same as the power data received from the previous retrieval. For example, the master component controller 110 can determine whether there is change between intervals for each A/D port independently. In this example, the master component controller 110 can determine there has been no change in the power data if the input signals on each A/D port has not changed. If there is no change, operations of the flowchart 500 continue at block 512. If there has been a change, operations of the flowchart 500 return to block 504 (where the timer is reset).

At block 512, the master component controller 110 increments the no change counter. Operations of the flowchart 500 continue at block 514.

At block 314, the master component controller 110 determine whether a value of the no change counter has exceeded a no change threshold. The no change threshold can be set to different values. The value of the no change threshold can vary based on different criteria (e.g., the type of hardware components, the number of hardware components, etc.). Example values of the no change threshold can include 40, 50, 20, 30, etc. If the value of the no change counter has not exceeded the no change threshold, operations return to block 504 (where the timer is reset). If the value of the no change counter has exceeded the no change threshold, operations continue at block 516.

At block 516, the master component controller 110 performs reset/safe mode operations. In this example, the master component controller 110 assumes that there is an error in the connection for receiving power data from the power data collector 110 because the data is not changing over time. The operations of performing reset/safe mode operations are described in flowcharts 600-700 of FIGS. 6-7 (which are now described).

Figure 6:
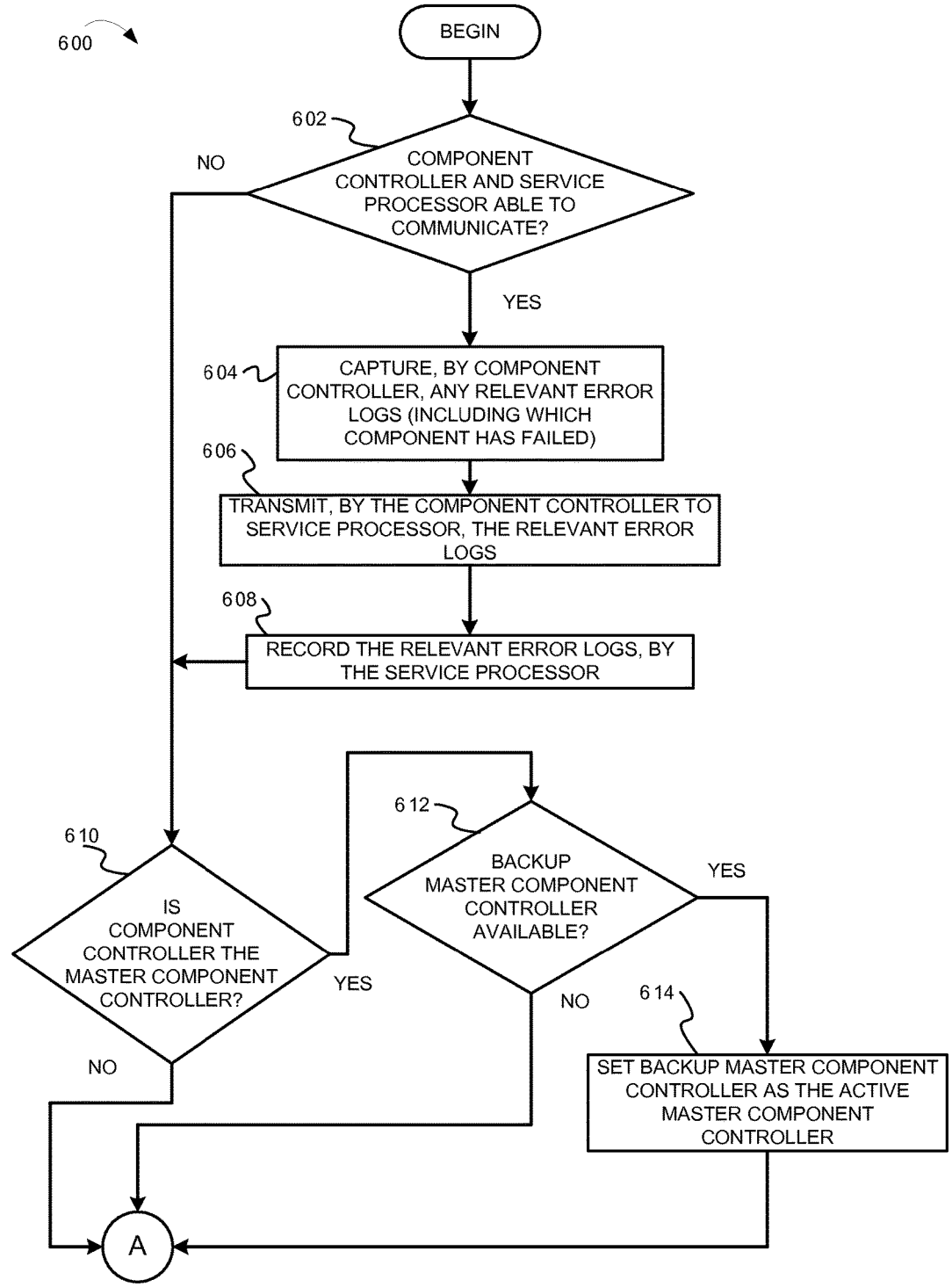
FIG. 6 depicts a flowchart for performing reset/safe mode operations, according to some embodiments.
Figure 7:
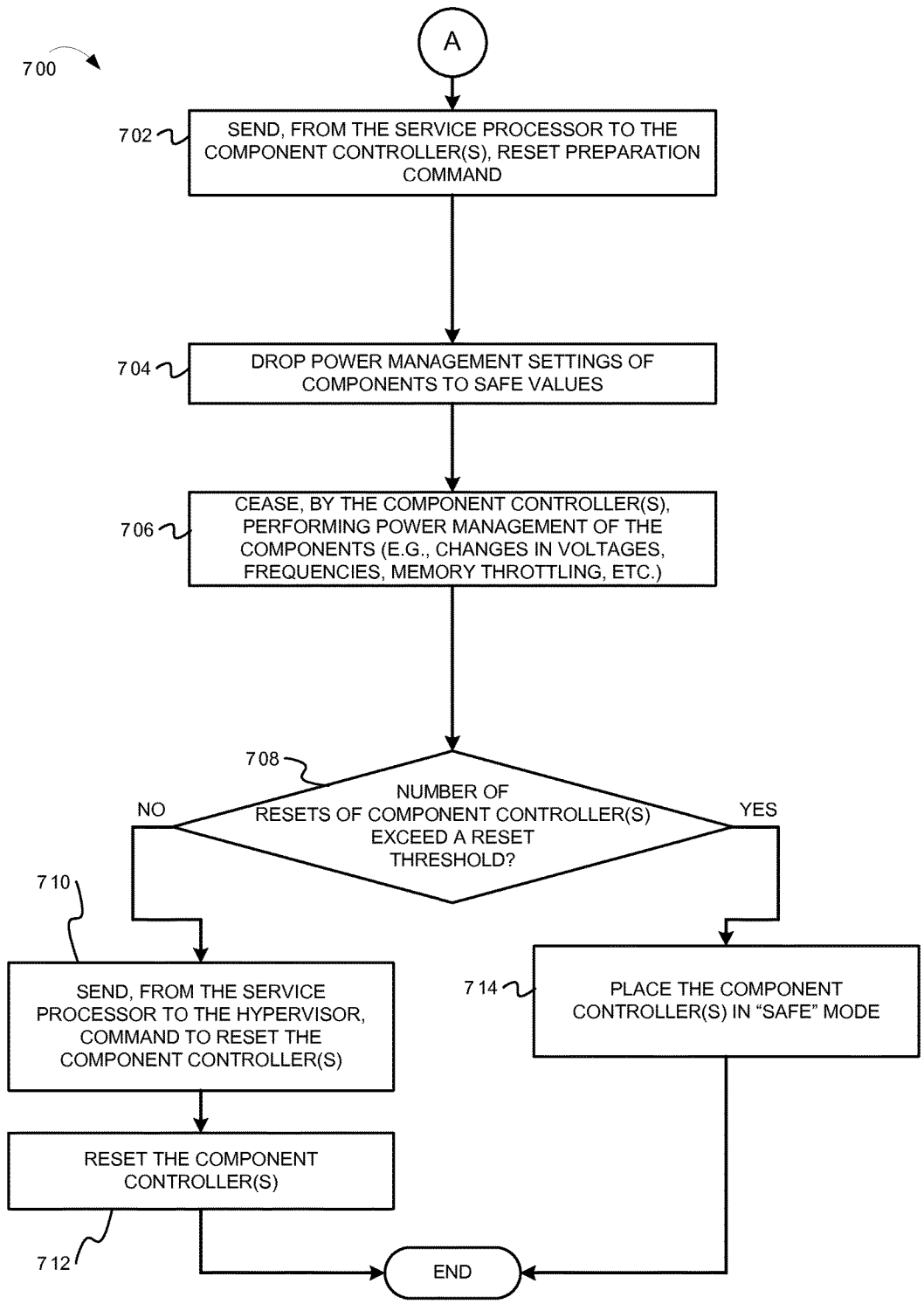
FIG. 7 depicts a flowchart for performing reset/safe mode operations, (which is a continuation from the flowchart of FIG. 6), according to some embodiments.

In particular, FIGS. 6-7 depict flowcharts for performing reset/safe mode operations, according to some embodiments. The operations of the flowcharts 600-700 are performed together and continue between each other as defined by transition point A. The operations of the flowcharts 600-700 can be performed by software, firmware, hardware or a combination thereof. With reference to the example of FIG. 1, the operations can be performed by the service processor 102, one or more of the component controllers 110, 112, and 114, and the hypervisor 138.

Also, the reset/safe mode operations depicted in the flowcharts 600-700 can be executed in response to different conditions/states in the node 100. In some embodiments, the reset/safe mode operations can be executed, in response to the component controller sending a request because of an error or failure in the processing module (e.g., a processor core is in a failed state). In some embodiments, the reset/safe mode operations can be executed, in response to no communication being received from a component controller. For example, the service processor 102 and the component controllers can be configured such that the component controllers are to periodically transmit a polling communication to the service processor 102. The polling communication can indicate that the processing module is operational with no failed components and no failure at the component controller. Alternatively if there is a failure of a component or of the component controller, the component controller can indicate that failure in the polling communication back to the service processor 102. In some embodiments, the reset/safe mode operations can be executed, in response to a determination that an update to the software executing on the component controller is needed. Operations of the flowchart 600 begin at block 602.

At block 602, the component controller determines whether it is able to communicate with the service processor 102. For example with reference to FIG. 1, assume that the processor core 126 is in a failed state. The master component controller 110 can make this determination. Operations of the flowchart 600 continue at block 604.

At block 604, the component controller captures any relevant error logs related to the failure. The component controller can capture the identification of the component that has failed and any data related to the error. For example, if the error relates to the memory 122, the master component controller 110 can attempt to capture the current state of the memory 122, transactions with the memory 122 prior to the failure, etc. Operations of the flowchart 600 continue at block 606.

At block 606, the component controller transmits the relevant error logs to the service processor. Operations of the flowchart 600 continue at block 608.

At block 608, the service processor records the relevant error logs. The error log can be used to analyze and correct the errors. For example, an administrator of the node 100 can analyze the relevant error logs and attempt to take any corrective action (if necessary). In an example, the corrective action can be downloading a software or firmware update to the failed component. Operations of the flowchart 600 continue at block 610.

At block 610, the service processor determines whether the component controller being reset or placed in a safe mode is the master component controller. With reference to FIG. 1, the service processor 102 can determine whether the component controller being reset or placed in a safe mode is the master component controller 110. If the component controller being reset or placed in a safe mode is the master component controller, operations of the flowchart 600 continue at block 612. Otherwise, operations of the flowchart 600 continue at transition point A, which continue at transition point A of the flowchart 700 (further described below).

At block 612, the service processor determines whether a backup master component controller is available. For example with reference to FIG. 1, the component controller 112 can be defined as the backup master component controller for the node 100. In this example, the service processor 102 determines whether the component controller 112 is operational (e.g., not being reset or in a safe mode). If backup master component controller is available, operations of the flowchart 600 continue at block 614. Otherwise, operations of the flowchart 600 continue at transition point A, which continue at transition point A of the flowchart 700 (further described below).

At block 614, the service processor sets the backup master component controller as the active master component controller. Continuing with the example above with reference to FIG. 1, the service processor sets the component controller 112 as the master component controller for the node 100. Otherwise, operations of the flowchart 600 continue at transition point A, which continue at transition point A of the flowchart 700 (now described).

The flowchart 700 of FIG. 7 is now described. Operations of the flowchart 700 begin at transition point A, which is a continuation from transition point A from the flowchart 700 of FIG. 7. From transition point A, operations of the flowchart 700 continue at block 702.

At block 702, the service processor 102 sends a reset preparation command to the component controller. For example, assume that the processor core 126 is in a failed state. The service processor 102 can send a reset preparation command to the master component controller 110. Operations of the flowchart 700 continue at block 704.

At block 704, the component controller drops the power management settings of the components to safe values. As described above, the component controller can adjust different settings of the different components to affect the power usage of the associated processing module. For example with reference to FIG. 1, the master component controller 110 can adjust the voltages and frequencies of the processor cores 124, 126, can throttle access to the memory 122, etc. In this example, the master component controller 110 would drop the power management settings of the processor cores 124, 126 and the memory 122. For example, the master component controller 110 would decrease the voltage and frequency of the processor cores 124, 126 to some determined safe thresholds. The master component controller 110 would also throttle the memory 122 to limit the number of accesses to and from the memory 122. In some embodiments, the master component controller 110 would also increase the speed of any fans in the processing module 104 to attempt to decrease the ambient temperature. Operations of the flowchart 700 continue at block 706.

At block 706, the component controller ceases performing power management of the components. For example, the master component controller 110 would cease perform power management of the components in the processing module 104. Operations of the flowchart 700 continue at block 708.

At block 708, the service processor 102 determines whether the number of resets for the component controller has exceeded a reset threshold. The reset threshold can be set to different values based on different criteria (e.g., the type of hardware components, the number of hardware components, etc.). Example values to which the reset threshold can be set include three, five, seven, etc. Therefore, the service processor 102 can determine if the component controller has been reset repeatedly, thereby indicating that a reset of the component controller is not correcting the failure, error, etc. If the service processor 102 determines that the number of resets for the component controller has not exceeded the reset threshold, operations of the flowchart 700 continue at block 710. Otherwise, operations of the flowchart 700 continue at block 714.

At block 710, the service processor send a command to reset the component controller to the hypervisor executing in one of the processor cores. With reference to FIG. 1, the service processor 102 sends a command to reset the component controller to the hypervisor 138 executing in the processor core 136. The hypervisor 138 can be software executing in the processor core 136 that can configure the node 100 to create one or more virtual machines to share the resources (the processor cores, the memories, etc.) in the node 100. In some other embodiments, other components can be configured to reset the component controller. For example, the service processor 102 can perform the reset, components external to the node 100, etc. Operations of the flowchart 700 continue at block 712.

At block 712, the component controller is reset. With reference to FIG. 1, the hypervisor 138 can transmit a command to the component controller to reset. In response, the component controller is reset, causing the component controller to reinitiate. Operations of the flowchart 700 along this path are complete.

At block 714, the component controller is placed in a "safe" mode. In particular, because the number of resets for the component controller has exceeded the reset threshold, the component controller is not reset and the power management settings for the components in the processing module remain at safe values (see the description of the operations at block 504 above). In the "safe" mode, the component controller is no longer operational. The component controller remains in the "safe" mode until the entire node 100 is rebooted or the firmware for the component controller is updated. In some embodiments, the components in the processing module that has a component controller in a "safe" mode can continue to be operational. Operations of the flowchart 700 along this path are complete.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
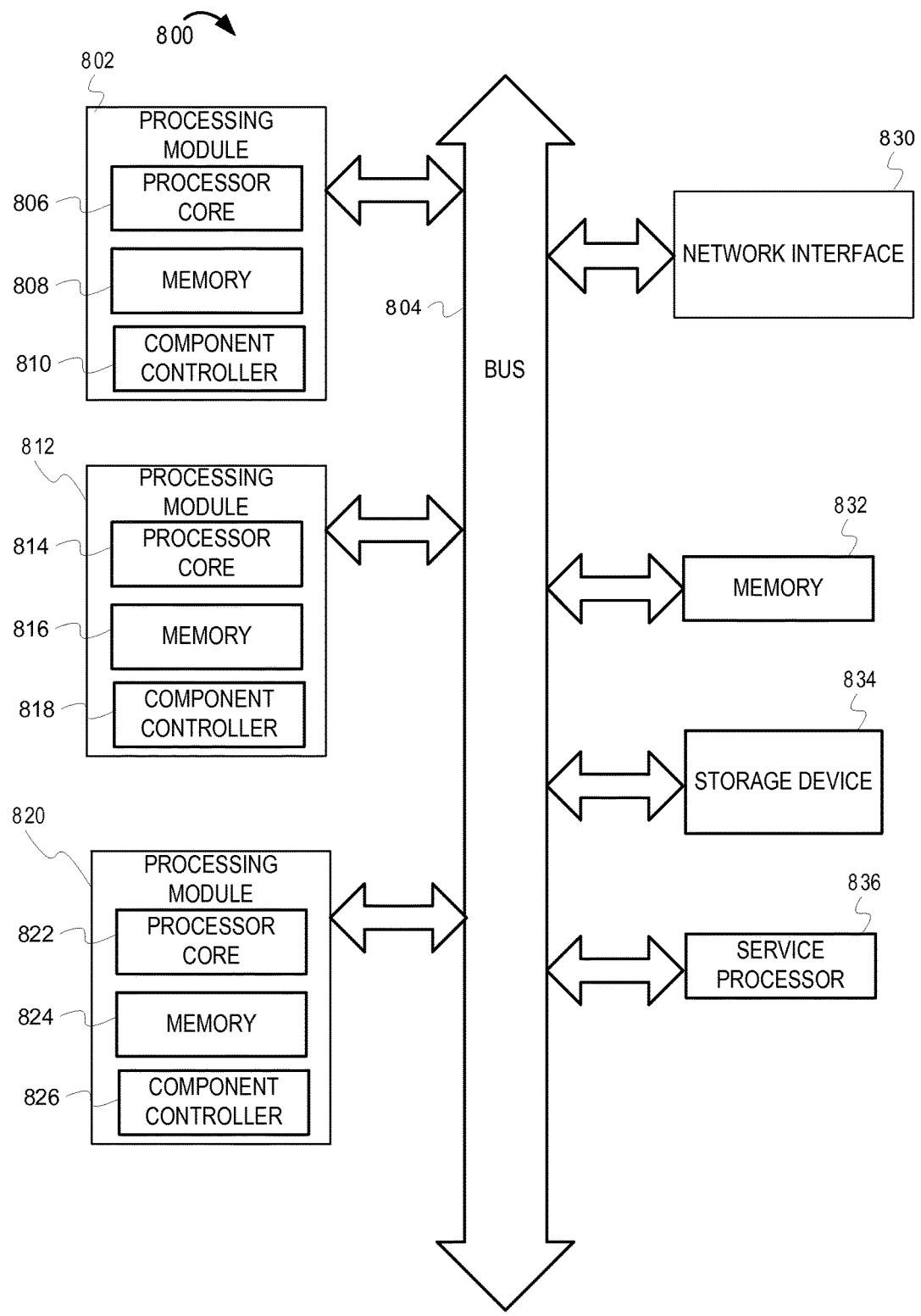
FIG. 8 depicts an example computer system, according to some embodiments.

FIG. 8 depicts an example computer system, according to some embodiments. A computer system 800 includes multiple processing modules (a processing module 802, a processing module 812, and a processing module 820). Each processing module can include multiple components and a component controller (as described above). In this example, the processing module 802 includes two components (a processor core 806 and a memory 808) and a component controller 810. The processing module 812 includes two components (a processor core 814 and a memory 816) and a component controller 818. The processing module 820 includes two components (a processor core 822 and a memory 824) and a component controller 826. While only depicting two components, one or more of the processing modules can have any number of components (e.g., multiple processor cores, multiple memories, etc.).

The computer system 800 also includes a memory 832 that is not within one of the processing modules. The memory 808, the memory 816, the memory 824, and the memory 832 can include different types of storage media (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.). The computer system also includes a bus 804, a network interface 830 (e.g., an ATM interface, an Ethernet interface, a Frame Relay interface, SONET interface, wireless interface, etc.), and a storage device 834 (e.g., optical storage, magnetic storage, etc.). The processing module 802, the processing module 812, the processing module 820, the network interface 830, the memory 832, the storage device 834, and the service processor 836 are communicatively coupled together through the bus 804.

The service processor 836 can perform the recovery operations for the component controllers and components (as described above). Further, realizations may include fewer or additional components not illustrated in FIG. 8 (e.g., video cards, audio cards, additional network interfaces, peripheral devices, etc.).

While the embodiments are described with reference to various implementations and exploitations, it will be understood that these embodiments are illustrative and that the scope of the inventive subject matter is not limited to them. In general, techniques for failure recovery of distributed control of power and thermal management as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus comprising:
    a plurality of components;
    a plurality of component controllers, wherein each of the plurality of component controllers is associated with at least one component of the plurality of components, each of the plurality of component controllers configured to separately manage power management settings and thermal protection for components associated with each of the plurality of component controllers; and
    a service processor coupled to the plurality of component controllers, wherein the service processor is configured to,
        monitor the plurality of component controllers for an irregular behavior associated with at least a first component controller of the plurality of component controllers or a first component associated with the first component controller;
        in response to detecting the irregular behavior:
            perform a reset of the first component controller without interrupting operations of at least one additional component associated with the first component controller that has not failed if a number of resets for the first component controller has not exceeded a reset threshold; and
            place the first component controller in a safe mode to decrease the power management settings or increase the thermal protection for components associated with the first component controller if the number of resets for the first component controller has exceeded the reset threshold.

2. The apparatus of claim 1, wherein the service processor is further configured to:
    transmit a reset preparation command prior to the reset to cause the first component controller to decrease the power management settings or increase the thermal protection of the first component.

3. The apparatus of claim 1, wherein the first component controller is configured to reduce at least one power management setting of the first component to below a safe threshold prior to the reset of the first component controller.

4. The apparatus of claim 3, wherein the first component controller is configured to cease an adjustment of the at least one power management setting prior to the reset and until the reset is complete.

5. The apparatus of claim 1, wherein the service processor being configured to place the first component controller in the safe mode comprises the service processor being configured to retrieve error logs and data captured by the first component controller.

6. The apparatus of claim 5, wherein the service processor being configured to monitor the plurality of component controllers for the irregular behavior comprises the service processor being configured to monitor for at least one condition selected from the group consisting of:
- loss of communication between the service processor and the first component controller;
- failure of the first component controller to maintain a hard power cap on an amount of power consumed by components managed by the first component controller;
- failure of the first component controller to maintain a temperature for the first component below a thermal threshold;
- loss of communication between the first component controller and the first component; and
- failure of the first component controller to transition between an observation state and an active state with regard to management of the first component.

7. The apparatus of claim 1, wherein the first component controller is configured to capture an error log that includes an identification of the failure and data further defining the failure prior to the reset.

8. A computer program product for distributed power management, the computer program product comprising:
- a non-transitory computer readable storage medium having computer usable program code embodied therewith, the computer usable program code configured to:
  - separately manage, by each of a plurality of component controllers, power management settings and thermal protection for components associated with each of the plurality of component controllers, wherein each of the plurality of component controllers is associated with at least one component of a plurality of components;
  - monitor, at a service processor, the plurality of component controllers for an irregular behavior associated with a first component controller or a first component associated with the first component controller;
  - in response to detecting the irregular behavior:
    - perform a reset, by the service processor, of the first component controller without interrupting operations of at least one additional component associated with the first component controller that has not failed if a number of resets for the first component controller has not exceeded a reset threshold; and
    - place the first component controller in a safe mode to decrease the power management settings or increase the thermal protection for components associated with the first component controller if the number of resets for the first component controller has exceeded the reset threshold.

9. The computer program product of claim 8, wherein the computer usable program code is configured to transmit, by the service processor, a reset preparation command prior to the reset, the reset preparation command to cause the first component controller to decrease the power management settings or increase the thermal protection of the first component.

10. The computer program product of claim 8, wherein the computer usable program code is configured to reduce, by the first component controller, at least one power management setting of the first component to below a safe threshold prior to the reset of the first component controller.

11. The computer program product of claim 10, wherein the computer usable program code is configured to cease, by the first component controller, an adjustment of the at least one power management setting prior to the reset and until the reset is complete.

12. The computer program product of claim 8, wherein the computer usable program code being configured to place, by the service processor, the first component controller in the safe mode comprises the computer usable program code being configured to retrieve error logs and data captured by the first component controller.

13. The computer program product of claim 12, wherein the computer usable program code being configured to monitor the plurality of component controllers for the irregular behavior comprises the computer usable program code being configured to monitor, by the service processor, for at least one condition selected from the group consisting of:
- loss of communication between the service processor and the first component controller;
- failure of the first component controller to maintain a hard power cap on an amount of power consumed by components managed by the first component controller;
- failure of the first component controller to maintain a temperature for the first component below a thermal threshold;
- loss of communication between the first component controller and the first component; and
- failure of the first component controller to transition between an observation state and an active state with regard to management of the first component.

* * * * *